March 10, 1925.
W. DEUTSCHER
AUTOMOBILE BODY SUPPORTING DEVICE
Filed April 14, 1921
1,528,874
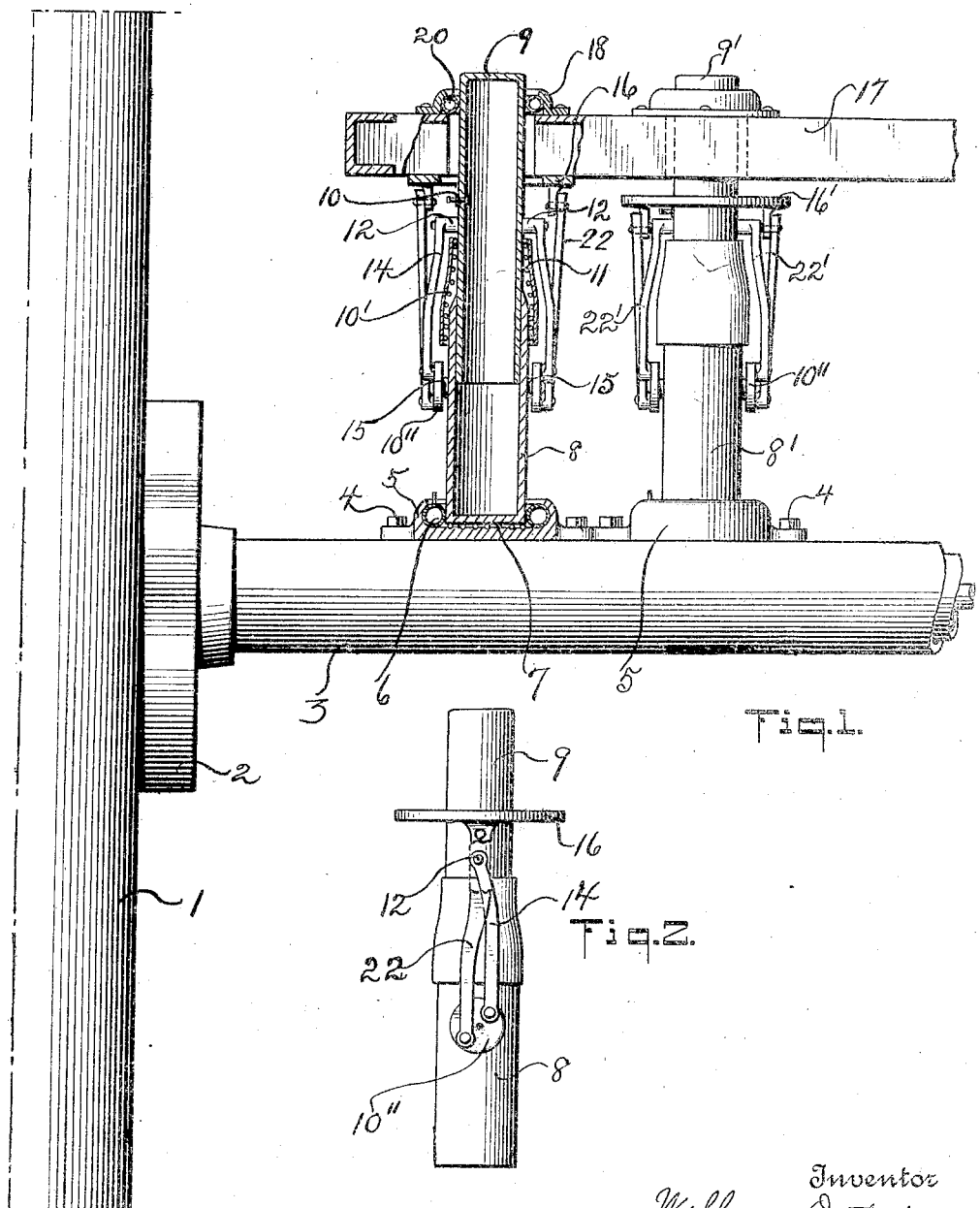

Patented Mar. 10, 1925.

1,528,874

UNITED STATES PATENT OFFICE.

WILLIAM DEUTSCHER, OF NEW YORK, N. Y., ASSIGNOR TO HIMSELF AND EMIL KURTZWEIL, OF NEW YORK, N. Y.

AUTOMOBILE BODY-SUPPORTING DEVICE.

Application filed April 14, 1921. Serial No. 461,365.

*To all whom it may concern:*

Be it known that I, WILLIAM DEUTSCHER, a citizen of the United States, residing in Manhattan, city of New York, in the county of New York and State of New York, have invented certain new and useful Improvements in Automobile Body-Supporting Devices, of which the following is a specification.

My invention relates to a new and improved form of apparatus for supporting the body of an automobile.

Up to the present time the body of an automobile has customarily been supported by means of springs of various types.

For many years the disadvantages of such springs have been well recognized and numerous forms of shock absorbers have been suggested which would be auxiliary to said springs and which would prevent the body from violently vibrating whenever the automobile was on a rough road and hit an obstacle or the like.

One of the objects of my invention is to provide a supporting means for the chassis of an automobile which will be resilient and which will have substantially the same resilient force, no matter what the vibration of the body may be.

Another object of my invention is to provide a suspension system which shall depend merely upon the reaction of a cylinder in which a vacuum has been created.

Other objects of my invention will be set forth in the following description and drawing which illustrate a preferred embodiment thereof.

In this preferred embodiment, my apparatus has been described as providing the sole support for the chassis, the springs being entirely eliminated, but it will be understood that if desired, springs can also be employed in connection with my improved apparatus. One of the devices herein described can be used in combination with each wheel, so that there will be four of such devices to bear either all or a part of the weight of the vehicle.

Figure 1 shows an end view of my apparatus.

Figure 2 shows a side view of one of the vacuum cylinders and the mechanism cooperating therewith.

The automobile has an ordinary wheel 1 provided with an ordinary hub 2 secured to the ordinary axle 3 in the well-known manner.

These parts are not more fully described as in themselves they are old and well-known, it only being necessary that the axle 3 shall not revolve, the wheels being actuated in the well-known manner.

The axle 3 has a series of cylindrical flanges or projections 5 secured thereto by the bolts 4 or any other suitable securing means.

Cylinders 8 and 8' are secured in these cylindrical hubs or flanges 5 in such a manner that they are separated from the walls of the said flanges 5 by resilient means which cushion any lateral movement or vibration of said cylinders 8.

In this embodiment the said cylinders rest upon ball bearings 7 and they are each surrounded by a cylindrical pipe 6 made of rubber or other resilient material which can be inflated by means of compressed air like an ordinary automobile tire, so as to provide a lateral cushion, or pipe which may be filled with any resilient or springy material to cause it to have the action of a cushion if it is not desired to use compressed air.

Since the cushioning means thus completely surrounds the lower end of the cylinder 8, any lateral movement of the said cylinder 8 is completely cushioned.

The cylinder 8 is provided with an upper slidable and piston-like member 9 which can move up and down within the said cylinder 8.

The air can be pumped out of the said cylinders 8 and 8' and their hollow pistons 9 and 9' through valves 10 so that a high vacuum is maintained in the space thus provided.

As a result of this vacuum the atmospheric pressure tends to force the piston member 9 downwardly and into its respective cylinder 8.

In order to prevent any leakage of air into the vacuum cylinders 8, a packing 10' made of rubber or other resilient material can be provided so as to permanently seal the joint between the cylinders 8 and its piston 9. Such packing can be of any well-known type but I prefer to have the said packing 10' made of stretchable and bendable material such as rubber, and to reinforce the same by an inner spiral spring member 11 so that as the piston 9 moves up and down the said packing 10' and the spiral spring 11 expand or contract. Of course, the said resilient material 10' is tightly secured at the upper and lower ends thereof to the cylinder 8 and the piston 9 respectively, so as to afford a tight seal.

As shown more particularly in Figure 2, each piston 8 is provided with a wheel 10'' which is pivotally secured at its central point by means of a short axle 15 to the said cylinder 8.

Each piston 9 is adjacent a flange 16 upon which the supporting member 17 which carries the body may rest.

As shown in Figure 1, the said supporting member 17 is provided with a flange 18 similar to the flange 5 before described, and this upper flange 18 is provided with resilient means 20 similar in construction to the resilient means 6 before described.

Each piston 9 has a bent rod 14 pivotally secured thereto at 12, and to the wheel 10'', and each flange 16 which can slide up and down freely with respect to the adjacent piston 9 is provided with a bent rod 22 pivotally secured to said flange and to the wheel 10''.

Hence the downward movement of each piston 9 causes an upward movement of each supporting flange 16 and this takes up the weight of the body.

It will be observed that the reaction on the rod 22 produced by each piston 9 remains substantially the same no matter how much each piston 9 moves up and down because a fairly high vacuum is maintained and the volume of the cylinders 8 and the pistons 9 is made so large, and the vacuum is made so low, that even though there may be a slight compression of the air due to the movement of each piston 9 this compression is so slight in comparison with the total weight of the chassis, that it may be neglected for practical purposes.

The cylinder 8', piston 9' and their connected parts are of the same construction as before mentioned, but the parts are so arranged that when the rod 22' of the piston 9' is at the lower or dead center of its wheel 10'', the flange 16' is below the flange 16. When the rod 22' has its bottom substantially at the upper dead center of its wheel 10'' the rod 22 has its bottom in the position shown in Fig. 2. Hence, in the normal operation of the device the rods 22 and 22' have their bottoms at different distances from the bottoms of their respective wheels 10'' and this is also true of the rod 14 and the corresponding rod 14' of the piston 9'. Of course, the rods 22 and 22' have the usual pivotal connections with their flanges 16 and 16' and these and other details are not illustrated in the drawings because in themselves they are old and well known and form no part of my invention.

Hence the cylinder 8' does not come into action unless an unusually heavy load is placed on the chassis.

The pistons 28 and 29 have a vacuum therein and they are connected by chains 30 and 31 to the axle 3 and the supporting member 17 respectively, so that they also cooperate to stop any violent upward jerky movement of the chassis. The hollow pistons 28 and 29 can have any suitable intermediate packing.

I have described a preferred embodiment of my invention, but it is clear that numerous changes and omissions may be made without departing from its spirit.

For example, if desired, the rods 14 and 22 instead of having their ends on the wheel 10'' at substantially the same distances from the center of revolution of the said wheel 10'', can have the said ends so spaced that the pistons 9 have a high leverage.

This can be done, of course, by having the ends of the rods 14 much farther away from the centers of revolution of the wheels 10'' than the rods 22.

Similarly the rods 14 and 22 can be provided with racks and the wheel 10'' may be made a spur wheel which shall mesh with these racks so that the lever arms of said rods 14 and 22 shall always be the same. If it is desired to provide the pistons 9 with a high leverage, then of course the wheels 10'' can be provided with two toothed faces of unequal diameters, the rods 14 meshing with the toothed face of greater diameter.

Of course, it is to be understood that the drawings herein are not according to scale and that the parts may be of any dimension required depending upon the size and weight of the automobile and the other springs before mentioned. For example, the wheels 10'' can be made of sufficient diameter so as to prevent the members 14 and 22 from reaching the upper and lower dead center in the ordinary movement of the body of the vehicle relative to the wheels thereof.

The operation of my device is as follows:

The weight of the body is first taken up by the member 16, and the tendency of this member 16 to descend, which would also cause the rod 22, shown in Fig. 2, to descend, is resisted by the tendency of the piston 9 to descend, as this causes the member 14, shown in Fig. 2 to descend, so as to revolve the wheel 10'' clockwise. If the member 16 descends too far, the body of the automobile contacts with the member 16' so that this becomes operative for the purposes of this invention before rod 22 of member 16 is at lower dead center.

I claim:

1. In a vehicle body supporting device, a cylinder having a vacuum therein, a piston located in said cylinder and adapted to be actuated by atmospheric pressure, and means operated by said piston for supporting the body of said vehicle, the said supporting means having a direction of movement different from the direction of movement of the said piston.

2. In an apparatus for supporting the body of a vehicle, a cylinder having a vacuum therein, a piston located in said cylinder and adapted to be actuated by atmospheric pressure, a flange adapted to take up the weight of the said body, and mechanism connecting the said piston and the said flange whereby the pressure of the atmosphere upon the said piston moves the said flange upwardly to take up the weight of the vehicle body, the said flange having a direction of movement different from the direction of movement of the said piston.

3. In an apparatus for supporting the body of a vehicle, an axle, a cylinder having a vacuum therein, located on the said axle, a piston located in the said cylinder and adapted to be operated by atmospheric pressure, revoluble means carried by the said axle, a supporting flange connected to the said revoluble means so as to be upwardly moved by the revolution thereof, and a connection between the said piston and the said revoluble means whereby the pressure of the atmosphere on the said piston tends to turn the said revoluble means.

4. In an apparatus for supporting the body of a vehicle, an axle, a cylinder having a vacuum therein, located on the said axle, a piston located in the said cylinder and adapted to be operated by atmospheric pressure, revoluble means carried by the said axle, a supporting flange connected to the said revoluble means so as to be upwardly moved by the revolution thereof, and a connection between the said piston and the said revoluble means whereby the pressure of the atmosphere on the said piston tends to turn the said revoluble means and cushioning means surrounding the said cylinder and cushioning any lateral movement thereof.

5. In an apparatus for supporting the weight of the body of a vehicle, the combination of a non-revolving axle having a flange thereon, a vertical cylinder having a vacuum located therein, and mounted in the said flange, a piston member located in the said cylinder and adapted to be vertically moved by the pressure of the atmosphere, so that it moves farther into the cylinder, a revoluble member secured to the said cylinder and connected to said piston member by a connecting rod, a supporting flange having an arm connected to the said revoluble member and adapted to be upwardly moved by the revolution thereof, whereby the pressure of the atmosphere tends to raise the said supporting flange to carry the weight of the vehicle.

In testimony whereof I hereunto affix my signature.

WILLIAM DEUTSCHER.